(12) United States Patent
Isobe et al.

(10) Patent No.: US 7,959,291 B2
(45) Date of Patent: Jun. 14, 2011

(54) TELECENTRIC LENS SYSTEM AND VISION MEASURING INSTRUMENT

(75) Inventors: Hitoshi Isobe, Kawasaki (JP);
Katsuyoshi Arisawa, Kawasaki (JP)

(73) Assignee: Mitutoyo Corporation, Kawasaki-shi (JP)

( * ) Notice: Subject to any disclaimer, the term of this patent is extended or adjusted under 35 U.S.C. 154(b) by 188 days.

(21) Appl. No.: 12/379,176

(22) Filed: Feb. 13, 2009

(65) Prior Publication Data

US 2009/0213328 A1 Aug. 27, 2009

(30) Foreign Application Priority Data

Feb. 21, 2008 (JP) ................. 2008-040389

(51) Int. Cl.
*A61B 3/14* (2006.01)
*A61B 3/10* (2006.01)
*G02B 13/22* (2006.01)
*G02B 1/06* (2006.01)
*G02B 9/00* (2006.01)

(52) U.S. Cl. ........ 351/206; 351/210; 351/216; 359/663; 359/666; 359/739

(58) Field of Classification Search .......... 351/200, 351/205–206, 208, 210, 213–214, 216–218, 351/221; 359/642, 646–647, 656, 661, 663, 666, 672–676, 684, 694, 696–698, 739

See application file for complete search history.

(56) References Cited

U.S. PATENT DOCUMENTS

| | | | |
|---|---|---|---|
| 5,668,665 A | 9/1997 | Choate | |
| 6,078,380 A * | 6/2000 | Taniguchi et al. | 355/52 |
| 6,560,012 B2 * | 5/2003 | Adachi et al. | 359/368 |
| 2003/0151823 A1 | 8/2003 | Okabe | |

FOREIGN PATENT DOCUMENTS

| | | |
|---|---|---|
| EP | 1 336 886 A2 | 8/2003 |
| JP | 2003-005068 | 1/2003 |
| JP | 2003-232999 | 8/2003 |

* cited by examiner

*Primary Examiner* — Dawayne A Pinkney
(74) *Attorney, Agent, or Firm* — Oliff & Berridge, PLC

(57) ABSTRACT

A telecentric lens optical system includes: a front lens group; a rear lens group having a front focal point coinciding with a rear focal point of the front lens unit; and diaphragm mechanisms, each of which is disposed at a position where the rear focal point of the front lens unit and the front focal point of the rear lens unit coincide with each other. One of the front lens group and the rear lens group is provided by a plurality of variable magnification lens groups. The diaphragm mechanisms are provided corresponding to the variable magnification lens groups, respectively. A magnification switching mechanism is provided to selectively move a pair of one of the variable lens groups and one of the corresponding diaphragm mechanisms to be disposed on an optical axis of the other of the front lens group and the rear lens group.

3 Claims, 8 Drawing Sheets

TELECENTRIC LENS SYSTEM AND VISION MEASURING INSTRUMENT

BACKGROUND OF THE INVENTION

1. Field of the Invention

The present invention relates to a telecentric lens system and a vision measuring instrument.

2. Description of Related Art

Traditionally, a so-called double-telecentric lens system has been known in which a front lens group and a rear lens group are arranged so that a rear focal point of the front lens group coincides with a front focal point of the rear lens group, and a diaphragm is provided at a position of the coinciding focal point.

Such a telecentric lens system has a wide visual field, a large focal depth, and a magnification of image formation determined by a focal length of the front lens group and the rear lens group irrespective of a position of an object. Accordingly, the telecentric lens system is often used to observe and measure an object having a stepped portion such as edge tools, mechanical parts, or assembled electronic parts.

However, in principle, resolution and focal depth are inversely proportional to each other in the telecentric lens system. In other words, when the focal depth is increased, the resolution is reduced. In order to observe an object at a higher resolution after setting a large focal depth, it is required to change a lens to another lens having a higher magnification or separately observe the object with a microscope having a high resolution. Replacing a lens or separately using a microscope is effort-consuming, which makes an observation operation complicated. Thus, operating efficiency is deteriorated. In addition, separately preparing a lens or a microscope is cost-consuming.

Thus, the inventors have suggested a telecentric lens system and a vision measuring instrument to solve such a problem (see Document 1: JP-A-2003-232999).

The telecentric lens system as disclosed in Document 1 includes: a front lens group; a rear lens group which is disposed so that a front focal point of the rear lens group coincides with a rear focal point of the front lens group; and a diaphragm mechanism which is disposed at a position where the front focal point of the rear lens group coincides with the rear focal point of the front lens group. The diaphragm mechanism has a numerical aperture changer for changing a numerical aperture.

Since the diaphragm mechanism is provided with the numerical aperture changer in such a telecentric lens system, the numerical aperture can be changed. In the telecentric lens system, focal depth and resolution are inversely proportional to each other. When the numerical aperture is reduced by the numerical aperture changer, the focal depth can be made large even though the resolution is low. In other words, an object having a stepped portion can be clearly observed to be measured. On the other hand, when the numerical aperture is increased by the numerical aperture changer, the resolution can be made high even though the focal depth is small. In other words, an object can be precisely observed to be measured at a high resolution.

However, since a single magnification is employed in the above-described telecentric lens system, the range of objects to be measured may be limited.

Further, in a telecentric lens system in which zoom lenses are used, it becomes difficult to associate a magnification with a diaphragm diameter of a diaphragm mechanism.

SUMMARY OF THE INVENTION

An object of the invention is to provide a telecentric lens system and a vision measuring instrument capable of enlarging a range of an object to be measured and improving measuring efficiency by varying a magnification and easily switching a diaphragm mechanism corresponding to the magnification to observe the object so as to solve conventional problems.

A telecentric lens system according to the aspect of the invention includes: a front lens group; a rear lens group having a front focal point coinciding with a rear focal point of the front lens group; and diaphragm mechanisms, each of which is disposed at a position where the rear focal point of the front lens group coincides with the front focal point of the rear lens group, in which one of the front lens group and the rear lens group is provided by a plurality of variable magnification lens groups, the diaphragm mechanisms are provided corresponding to the variable magnification lens groups, respectively, and a magnification switching mechanism is provided to selectively move a pair of one of the variable lens groups and one of the corresponding diaphragm mechanisms to be disposed on an optical axis of the other of the front lens group and the rear lens group.

According to the aspect of the invention, one of the front lens group and the rear lens group is provided by the plurality of the variable magnification lens groups having different magnifications, and the diaphragm mechanisms are provided corresponding to the variable magnification lens groups, respectively. Further, the magnification switching mechanism is provided to selectively move the pair of one of the variable magnification lens groups and the corresponding one of the diaphragm mechanisms to be disposed on the optical axis of the other of the front lens group and the rear lens group. Accordingly, when a variable magnification lens group having a desired magnification is moved to be disposed on the optical axis of the other of the front lens group and the rear lens group by the magnification switching mechanism, the diaphragm mechanisms corresponding to the variable magnification lens group can be also moved to be disposed on the optical axis.

Thus, an object to be measured can be observed at a desired magnification while one of the diaphragm mechanisms can be automatically selected corresponding to the desired magnification. Consequently, the range of the object to be measured can be enlarged, and measuring efficiency can be improved.

In the telecentric lens system according to the aspect of the invention, the magnification switching mechanism may include a slide plate, a guide mechanism that supports the slide plate to be slidable in a direction approximately orthogonal to an optical axis of the other of the front lens group and the rear lens group, and a magnification switching unit for sliding the slide plates. A plurality of pairs of the variable magnification lens groups and the corresponding diaphragm mechanisms may be arranged in a sliding direction of the slide plates.

In such an arrangement, when the slide plate is slid by the magnification switching unit, the pairs of the variable magnification lens groups and the corresponding diaphragm mechanisms provided on the slide plate are switchably moved to be disposed on the optical axis of the other of the front lens group and the rear lens group. In other words, only by sliding the slide plate, magnification can be changed. Thus, operation for changing the magnification can be extremely simplified.

In the telecentric lens system according to the aspect of the invention, each of the diaphragm mechanisms is provided by a numerical aperture changer that changes a numerical aperture.

Since each of the diaphragm mechanisms is provided by the numerical aperture changer, the numerical aperture of each diaphragm mechanism can be changed. In the telecentric lens system, focal depth and resolution are inversely proportional to each other. When the numerical aperture is reduced by the numerical aperture changer, the focal depth can be made large even though the resolution is low. In other words, an object having a stepped portion can be clearly observed to be measured. On the other hand, when the numerical aperture is increased by the numerical aperture changer, the resolution can be increased even though the focal depth is small. In other words, the object to be measured can be precisely observed to be measured at a high resolution.

Since the numerical aperture is changed by the numerical changer, various objects can be measured by adjusting focal depth and resolution, e.g. from a large focal depth to a high resolution. Thus, various observations for different purposes can be consecutively performed in the same telecentric lens system. Consequently, operating efficiency can be considerably improved. Further, it is not required to use a separate microscope and the like depending on purposes, which reduces costs.

In the telecentric lens system according to the aspect of the invention, the numerical aperture changer may have two or more diaphragms having different numerical apertures in incremental steps, and change the numerical aperture by switching the diaphragms.

In such an arrangement, the numerical aperture can be changed by switching the diaphragms having different numerical apertures. Thus, various observations having different purposes (large focal depth, high resolution and the like) can be consecutively performed in the same telecentric lens system, which improves operating efficiency. Further, it is not required to use a separate microscope and the like depending on purposes, which reduces costs.

When a plurality of diaphragms having predetermined numerical apertures are provided while optical performance (focal depth, resolution and the like) relative to each of the numerical apertures is given, the most appropriate numerical aperture can be selected in accordance with various objects to be measured or purposes. When an observed image is subjected to an image processing to be measured, for example, the most appropriate vision measuring can be performed because the optical performance is known.

In the telecentric lens system according to the aspect of the invention, each of the diaphragm mechanisms may include: a first diaphragm disposed on the optical axis of the other of the front lens group and the rear lens group; a swing lever having a middle portion supported to be swingable and an end supported to be retractable from a position of the first diaphragm; and a second diaphragm formed on the end of the swing lever and having a smaller diameter than a diameter of the first diaphragm. The numerical aperture switching unit may be provided to rotatably connect the end of the swing lever of the diaphragm mechanisms and swing the swing lever thereof about a swinging supporting point.

In such an arrangement, the numerical aperture of the diaphragm disposed on the optical axis can be changed by swinging the swing lever. By selecting the numerical aperture in accordance with objects to be measured or purposes, various observations having different purposes can be consecutively performed in the same telecentric lens system, which improves operating efficiency.

Further, the numerical aperture switching unit is provided to rotatably connect the base end of the swing lever of each diaphragm mechanism and swing the swing lever of each diaphragm mechanisms about the swinging supporting point. Thus, while one pair of the variable magnification lens groups and the corresponding diaphragm mechanisms is moved to be disposed on the optical axis, the variable numerical aperture disposed on the optical axis can be varied by operating the numerical switching unit. In other words, the numerical aperture of the diaphragm mechanism disposed on the optical axis can be varied only by operating one numerical aperture switching unit, thereby improving operating efficiency.

In the telecentric lens system according to the aspect of the invention, the magnification switching unit and the numerical aperture switching unit are provided on the slide plate to protrude in directions parallel to a sliding direction of the slide plate, the directions being mutually in the same direction.

According to the aspect of the invention, the magnification switching unit and the numerical aperture switching unit are provided to protrude in the directions parallel to the sliding direction of the slide plate, the directions being mutually in the same direction. Thus, a desired magnification is initially swichably provided by the magnification switching unit and then the numerical aperture is varied by the numerical aperture switching unit, it is easy to hold the numerical aperture switching unit after holding the magnification switching unit. In other words, after the magnification switching unit is operated with one hand, the numerical aperture switching unit can be held by moving the same hand for operation without looking away from the observation optical system.

A vision measuring instrument according to another aspect of the invention may include the telecentric lens system as described above and an image pickup optical system connected to the telecentric lens system.

In such an arrangement, the vision measuring instrument can offer the above-described advantages. In other words, various observations for different purposes can be consecutively performed in the same vision measuring instrument. Consequently, operating efficiency can be considerably improved. Further, it is not required to use a separate vision measuring instrument depending on purposes, which reduces costs.

A vision measuring instrument according to still another aspect of the invention, includes: a telecentric lens system, an illumination optical system introducing light into the telecentric lens system; magnification detection units that detect a magnification switched by the magnicifation switching mechanism; numerical aperture detection units that detect a numerical aperture switched by the numerical aperture changer; an image pickup optical system connected to the telecentric lens system; and an image processor that processes image information obtained by the image pickup optical system, in which the image processor performs at least one of an illumination condition correction of the illumination optical system, a magnification correction of the variable magnification lens groups, and an axial alignment in accordance with a magnification detected by the magnification detection units and a numerical aperture detected by the numerical aperture detection units.

In such an arrangement, the magnification switched by the magnification switching mechanism is detected by the magnification detection units while the numerical aperture switched by the numerical switching operating unit is detected by the numerical detection switches. Thus, in the image processor, at least one of an illumination condition correction of the illumination optical system, a magnification correction of the magnification lens groups, and an axial alignment is performed in accordance with the detected magnifications and numerical apertures, which allows highly precise measurement.

DETAILED DESCRIPTION OF PREFERRED EMBODIMENT(S)

An exemplary embodiment of the invention will be described below with reference to the accompanying drawings.

Arrangement of Exemplary Embodiment

Figure 1:
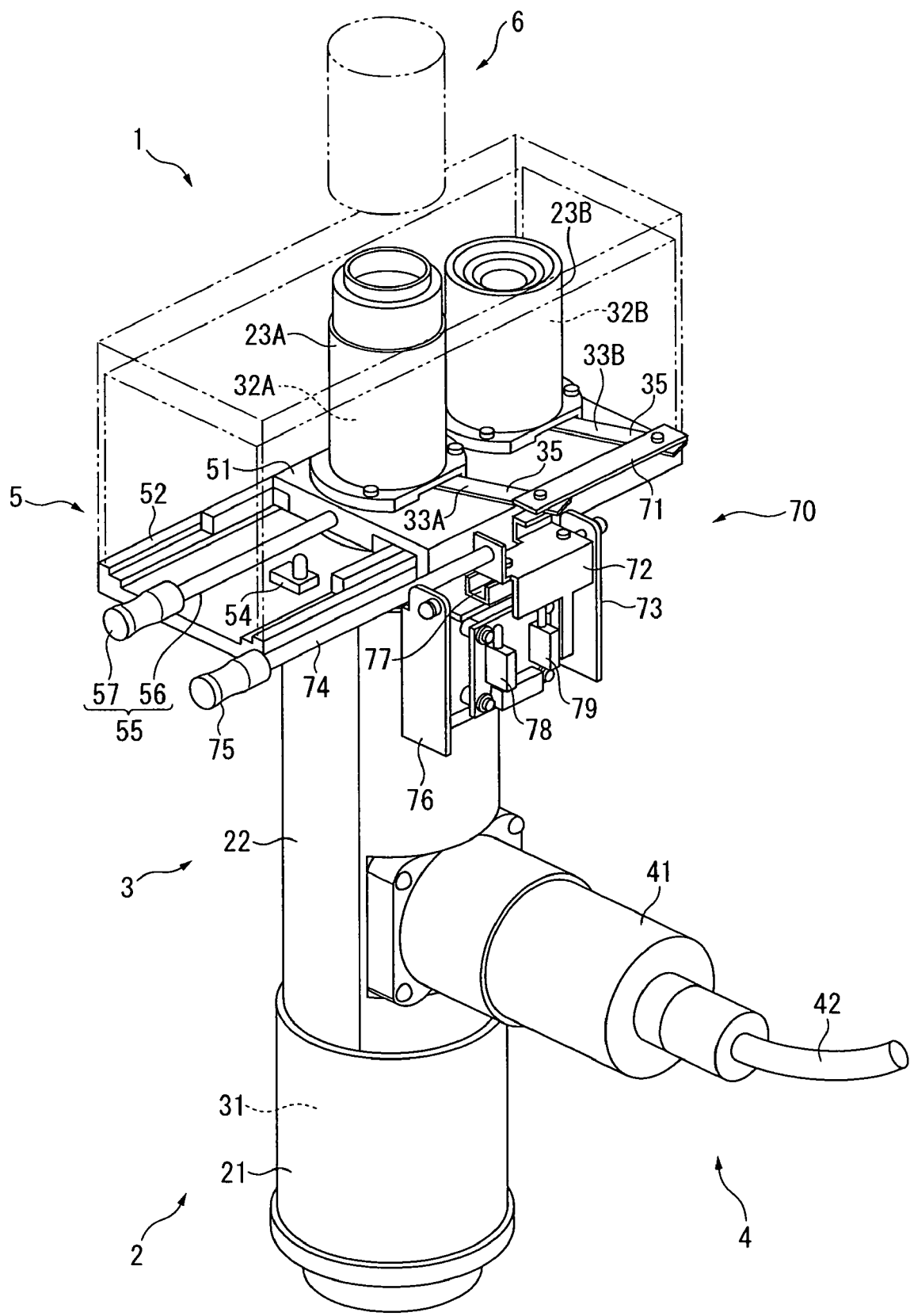
FIG. 1 shows an exemplary embodiment of the invention.

FIG. 1 shows the exemplary embodiment of a vision measuring instrument using a telecentric lens system of the invention.

A vision measuring instrument 1 of the exemplary embodiment includes: a tubular hollow lens barrel 2; a telecentric lens system 3 provided within the lens barrel 2; an illumination optical system 4 provided perpendicular to the lens barrel 2; a magnification switching mechanism 5; and an image pickup optical system 6 such as an CCD camera connected to the telecentric lens system 3.

The lens barrel 2 includes a front cylindrical section 21, a middle cylindrical section 22, and two rear cylindrical sections 23A and 23B.

The middle cylindrical section 22 is detachably connected to a rear side of the front cylindrical section 21.

One of the two rear cylindrical sections 23A and 23B is selected to be connected to a rear side of the middle cylindrical section 22 via the magnification switching mechanism 5.

The image pickup optical system 6 is optically coupled to a rear side of one of the rear cylindrical sections 23A and 23B which is connected to the middle cylindrical section 22.

The telecentric lens optical lens 3 includes: a front lens group 31 accommodated in the front cylindrical section 21; a pair of rear lens groups 32A and 32B accommodated in the rear cylindrical sections 23A and 23B; and diaphragm mechanisms 33A and 33B provided corresponding to the rear lens groups 32A and 32B, respectively.

Figure 2:
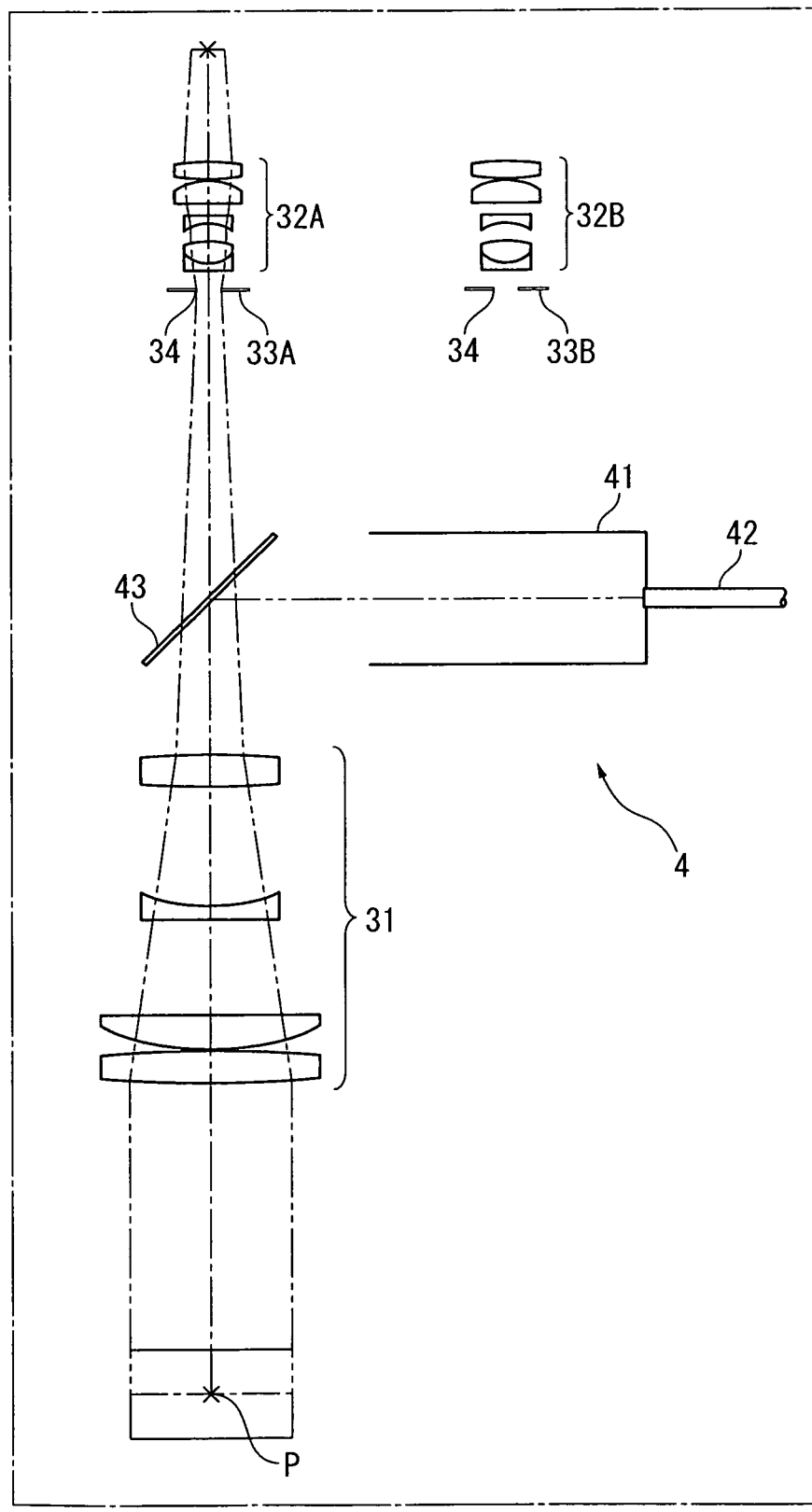
FIG. 2 shows a telecentric lens system according to the exemplary embodiment.

As shown in FIG. 2, the front lens group 31 is provided by a convex lens, a concave lens, and a joint lens including a convex lens and a concave lens jointed together. Similarly, the rear lens groups 32A and 32B are also provided by a convex lens, a concave lens, and a joint lens including a convex lens and a concave lens jointed together as shown in FIG. 2. Incidentally, the rear lens groups 32A and 32B are provided by a plurality of variable magnification lens groups having various magnifications.

The front lens group 31 and the rear lens groups 32A and 32B are disposed so that a rear focal point of the front lens group 31 coincides with a front focal point of the rear lens groups 32A and 32B. The diaphragm mechanisms 33A and 33B are disposed at a position where these focal points coincide with each other.

Incidentally, lens combinations of the front lens group 31 and the rear lens groups 32A and 32B to correct telecentricity and various aberrations are disclosed in, for example, Japanese Patent Application No. 2001-185241.

The illumination optical system 4 includes: an illumination cylindrical section 41 having one end perpendicular to the middle cylindrical section 22 and penetrating the middle cylindrical section 22; an optical fiber 42 connected to the other end of the illumination cylindrical section 41; a beam splitter 43 provided within the middle cylindrical section 22 for reflecting light from the illumination cylindrical section 41 toward the front lens group 31; and a relay lens (not shown) for condensing the light.

The optical fiber 42 is connected to a light source (not shown) to guide light from the light source into the illumination cylindrical section 41.

The magnification switching mechanism 5 includes: a slide plate 51; a guide mechanism 52 fixed on the rear side of the middle cylindrical section 22 to support the slide plate 51 to be slidable in a direction approximately orthogonal to an optical axis of the front lens group 31 and orthogonal to the illumination cylindrical section 41; and a magnification switching unit 55 being operated to slide the slide plate 51.

The plurality of rear lens groups 32A and 32B (variable magnification lens groups) and the corresponding diaphragm mechanisms 33A and 33B are arranged on the slide plate 51 to be spaced away from each other by a predetermined distance in a sliding direction of the slide plate 51.

The guide mechanism 52 is provided with first and second magnification detection switches 53 and 54 as magnification detection units that detect a magnification switched at a switching position of the slide plate 51. (The magnification detection switch 53 is hidden under the slide plate 51 in FIG. 1, which is therefore not shown. See FIG. 5.) The first magnification detection switch 53 is switched on by the slide plate 51 when the rear lens group 32A (a first variable magnification lens group) is positioned on the optical axis of the front lens group 31, and the second magnification detection switch 54 is switched on by the slide plate 51 when the rear lens group 32B (a second variable magnification lens group) is positioned on the optical axis of the front lens group 31.

The magnification switching unit 55 is provided by an operating rod 56 projecting toward the middle of an end surface of the slide plate 51 in the sliding direction, and a knob 57 disposed on an end of the operating rod 56.

The diaphragm mechanisms 33A and 33B are provided between the magnification switching mechanism 5 and the rear cylindrical sections 23A and 23B. The diaphragm mechanisms 33A and 33B are provided by a numerical aperture changer including two or more diaphragms having different numerical apertures in incremental steps.

Figure 3:
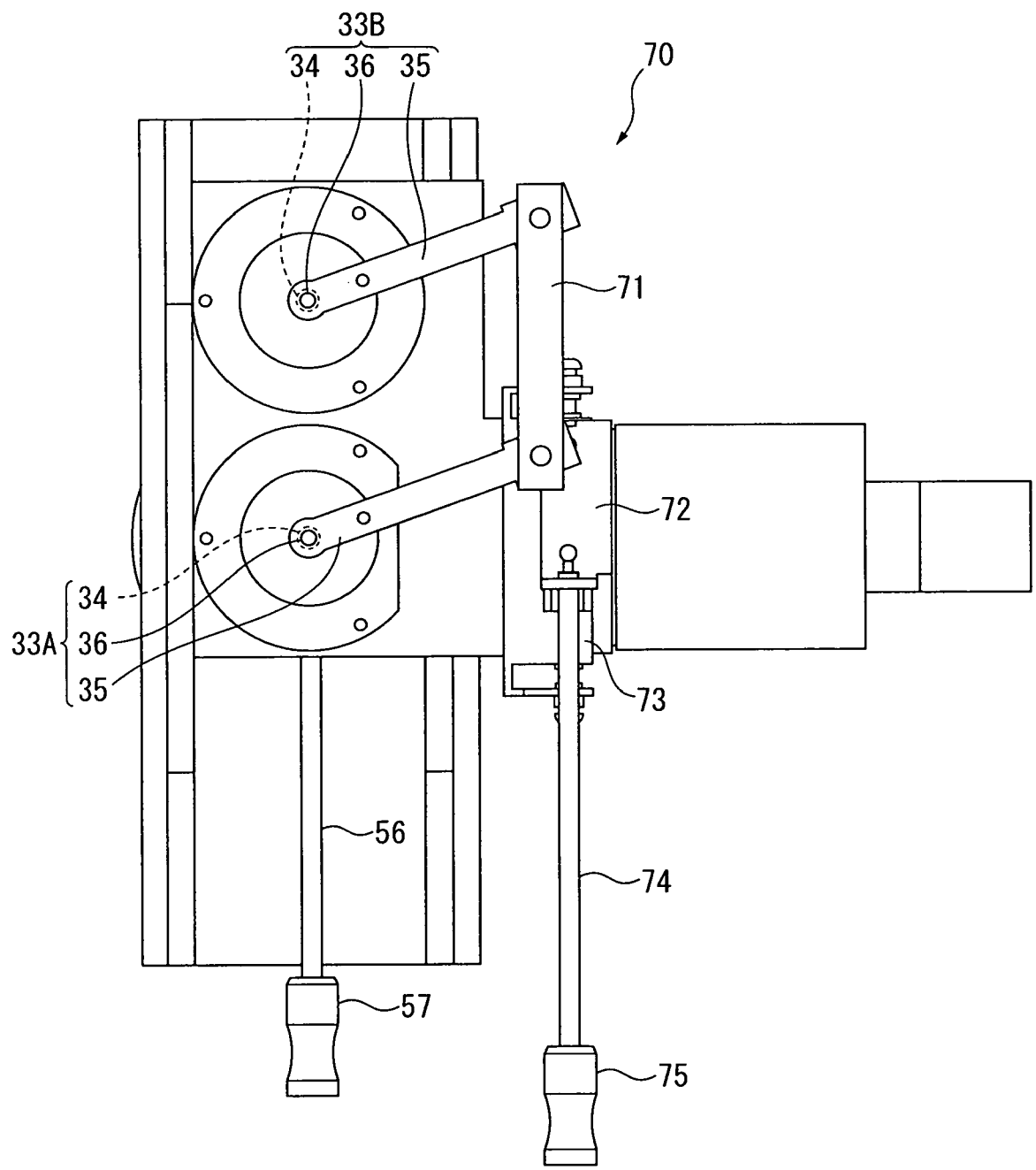
FIG. 3 shows a diaphragm mechanism according to the exemplary embodiment.
Figure 4:
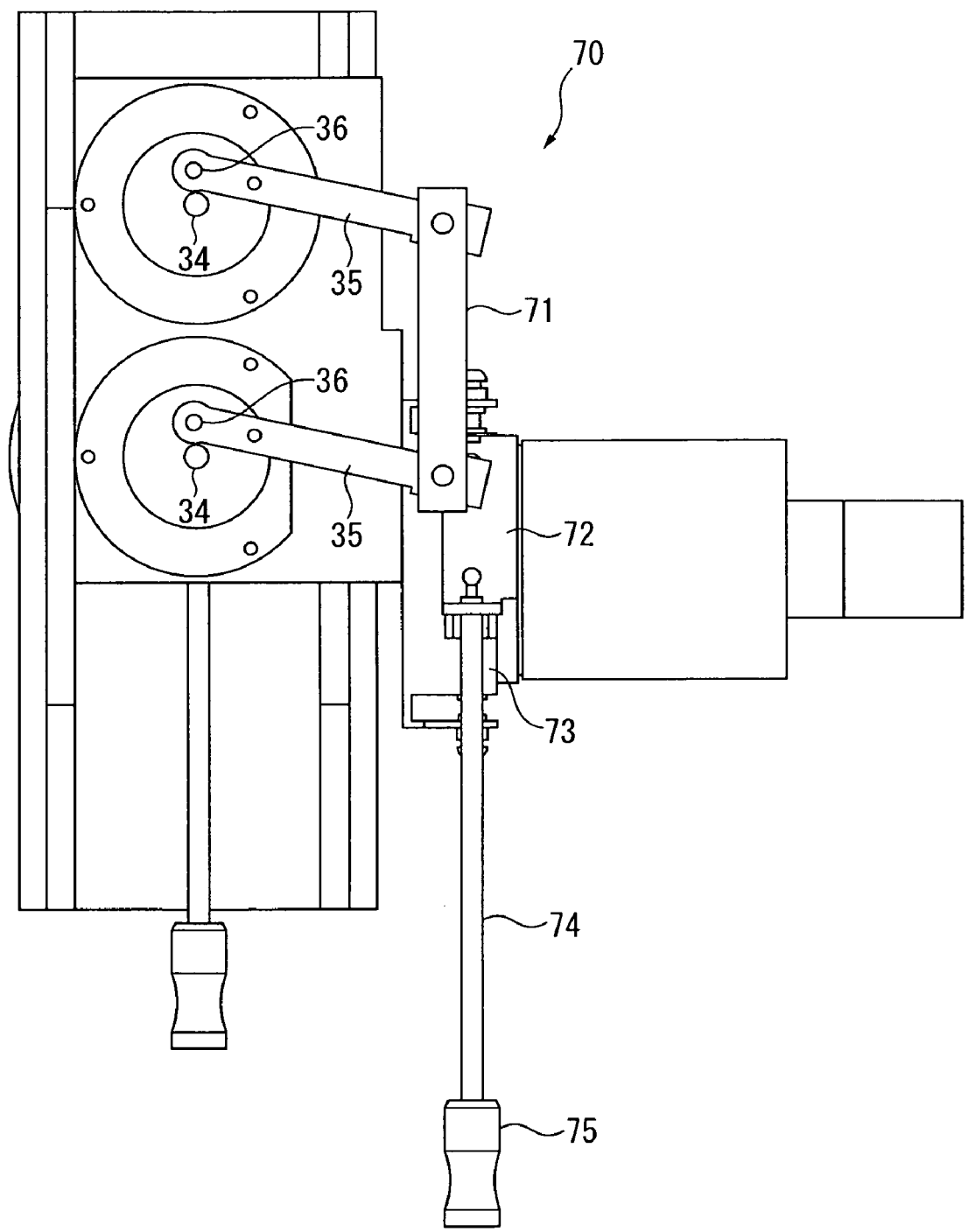
FIG. 4 is an illustration for explaining an operation of the diaphragm mechanism according to the exemplary embodiment.

Specifically, as shown in FIGS. 3 and 4, the diaphragm mechanisms 33A and 33B include a large aperture diaphragm 34 as a first diaphragm disposed on the optical axis of the front lens group 31, a swing lever 35 having a middle portion supported to be swingable and an end supported to be retractable from the large aperture diaphragm 34, and a small aperture diaphragm 36 as a second diaphragm disposed on an end of the swing lever 35 and having a smaller diameter than a diameter of the large aperture diaphragm 34.

A numerical aperture switching unit 70 is provided on a base end of the swing lever 35 of each of the diaphragm mechanisms 33A and 33B to rotatably connect the diaphragm mechanisms 33A and 33B and swing the swing lever 35 about a swinging supporting point.

As shown in FIG. 1 and FIGS. 3 and 4, the numerical aperture switching unit 70 includes: a link piece 71 rotatably connected to a base end of the swing lever 35 of the diaphragm mechanisms 33A and 33B; a slide piece 72 rotatably connected to the link piece 71; a guide mechanism 73 that supports the slide piece 72 to be slidable in a direction in parallel to the sliding direction of the slide plate 51; an operating rod 74 projecting parallel to the operating rod 56 on an end surface of the slide piece 72 in a sliding direction thereof; and a knob 75 provided on an end of the operating rod 74.

The guide mechanism 73 includes a support plate 76 formed integrally bending from the slide plate 51, a guide rail 77 that guides the slide piece 72 provided on the support plate 76.

As shown in FIG. 1, the support plate 76 is provided with first and second numerical aperture detection switches 78 and 79 as numerical aperture detection units for detecting a numerical aperture switched by the diaphragm mechanisms 33A and 33B. Specifically, the first numerical aperture detection switch 78 is switched on by the slide piece 72 when the small aperture diaphragm 36 is retracted from the large aperture diaphragm 34, and the second numerical aperture detection switch 79 is switched on by the slide piece 72 when the small aperture diaphragm 36 is disposed on the large aperture diaphragm 34.

Figure 5:
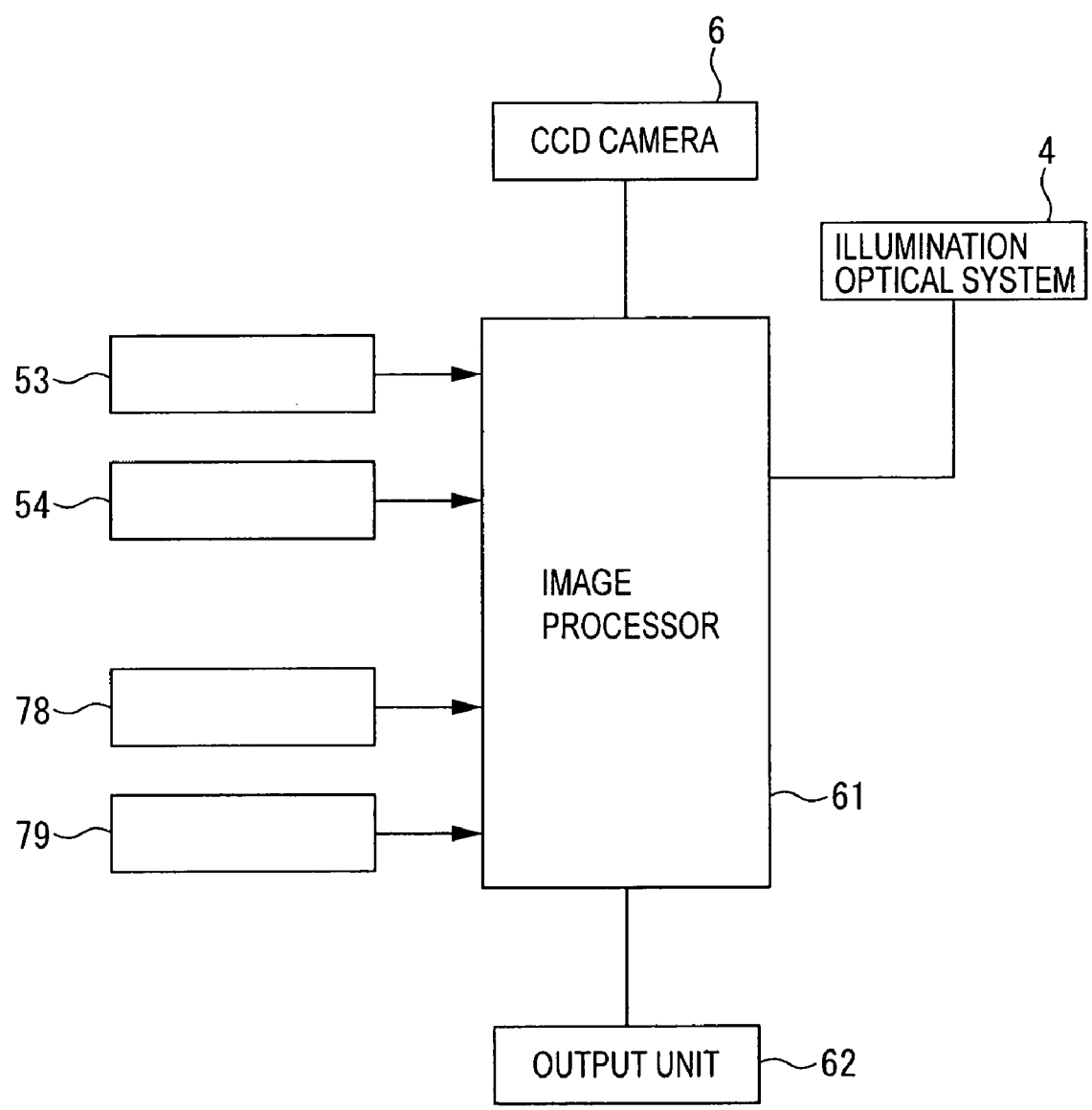
FIG. 5 is a block diagram showing an image processing according to the exemplary embodiment.

As shown in FIG. 5, an image processor 61 is connected to the image pickup optical system 6. The image processor 61 processes image information obtained by the image pickup optical system 6 to output the processed image information to an output section 62 while performing correction processing in accordance with a combination of a magnification detected by the magnification detection switches 53 and 54 and a numerical aperture detected by the numerical aperture detection switches 78 and 79. In this exemplary embodiment, an illumination condition of the illumination optical system 4 is corrected.

Operation of Exemplary Embodiment

In such an arrangement, for instance, an object to be measured is disposed on a middle point P as shown in FIG. 2. After light passing through the optical fiber 42 is reflected at a beam splitter 43, the light passes through the front lens group 31 to irradiate the object to be measured. Then, the light from the object to be measured passes through the front lens group 31 and the beam splitter 43 to be subsequently adjusted with the large aperture diaphragm 34 of the diaphragm mechanism 33A to enter into the rear lens group 32A for imaging the object by the image pickup optical system 6.

At this time, by operating the magnification switching mechanism 5, the rear lens group 32B is moved to be disposed on the optical axis of the front lens group 31. To move the rear lens group 32B, the knob 57 of the magnification switching unit 55 is pulled toward the left side in FIG. 1 to slide the slide plate 51. Consequently, the rear lens group 32B and the diaphragm mechanism 33B are disposed on the optical axis of the front lens group 31. Thus, the object to be measured can be observed at a magnification of the switched rear lens group 32B.

While either one of the variable magnification lens groups is disposed on the optical axis, the large aperture diaphragm 34 is set on the optical axis by swinging the swing levers 35 of the diaphragm mechanisms 33A and 33B as shown in FIG. 2. In other words, the small aperture diaphragm 36 is retracted from the optical axis. Consequently, an image at a high resolution can be obtained because of the large numerical aperture.

Figure 6:
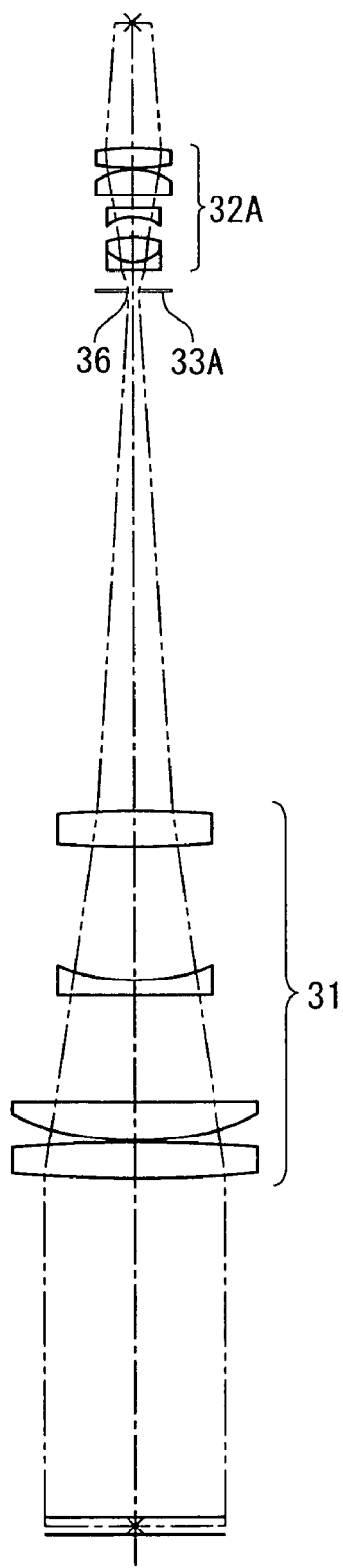
FIG. 6 shows a small aperture diaphragm fitted into the diaphragm mechanism according to the exemplary embodiment.

On other hand, when the small aperture diaphragm 36 is set on the optical axis by swinging the swing levers 35 of diaphragm mechanisms 33A and 33B as shown in FIG. 6, an image having a large focal depth can be obtained because of the small numerical aperture.

Advantage of Exemplary Embodiment (1) The rear lens groups 32A and 32B are provided by the plurality of variable magnification lens groups having different magnifications. The plurality of diaphragm mechanisms 33A and 33B are provided corresponding to the variable magnification lens groups. The magnification switching mechanism 5 is provided to selectively move a pair of one of the variable magnification lens groups and the corresponding one of the diaphragm mechanisms 33A and 33B to be disposed on the optical axis. Thus, when the variable magnification lens group having a desired magnification is moved to be disposed on the optical axis of the front lens group 31 by the magnification switching mechanism 5, the diaphragm mechanism 33A or 33B corresponding to the variable magnification lens group is also moved to be disposed on the optical axis.

Thus, the object to be measured can be observed with a desired magnification while the diaphragm mechanisms 33A and 33B can be automatically selected corresponding to the desired magnification. Thus, the range of an object to be measured can be enlarged, and measuring efficiency can be improved.

(2) When the slide plate 51 is slid by the magnification switching unit 55, one pair of one of the variable lens groups and the corresponding one of the diaphragm mechanisms 33A and 33B provided on the slide plate 51 is moved to be disposed on the optical axis of the front lens group 31. In other words, only by sliding the slide plate 51, magnifications can be changed. Thus, the magnification changing operation can be extremely simplified.

(3) The numerical aperture can be changed because each of the diaphragm mechanisms 33A and 33B includes the numerical aperture changer. In the telecentric lens system 3, focal depth and resolution are inversely proportional to each other. When the numerical aperture is reduced by the numerical aperture changer, the focal depth can be made large even though the resolution is low. In other words, an object having a stepped portion can be clearly observed to be measured. On the other hand, when the numerical aperture is increased by the numerical aperture changer, the resolution can be made high even though the focal depth is small. In other words, the object can be precisely observed to be measured at a high resolution.

(4) Since the numerical aperture can be changed by the numerical changer, various objects can be measured by adjusting focal depth and resolution, e.g. from a large focal depth to a high resolution. Thus, various observations having different purposes can be performed consecutively with the same telecentric lens system 3. Consequently, operating efficiency can be considerably improved. Further, it is not required to use a separate microscope or the like depending on the purposes, which reduces costs.

(5) The numerical aperture can be changed by changing a diaphragm having a different numerical aperture. Thus, various observations having different purposes (e.g., large focal depth, high resolution) can be consecutively performed with the same telecentric lens system, which improves operating efficiency. Also, it is not required to use a separate microscope or the like depending on the purposes, which reduces costs.

When a plurality of diaphragms having predetermined numerical apertures are provided while an optical performance (e.g., focal depth, resolution) relative to each numerical apertures is given, the most appropriate numerical aperture can be easily selected in accordance with various objects to be measured or purposes. When an observed image is subjected to an image processing to be measured, the most appropriate image measuring operation can be performed because the optical performance is given.

(6) The diaphragm mechanisms 33A and 33B include a large aperture diaphragm 34 disposed on the optical axis of the front lens group 31, the swing lever 35 having a middle portion supported to be swingable and an end supported to be retractable from a position of the large aperture diaphragm 34, and the small aperture diaphragm 36 provided on the end of the swing lever 35 and having the smaller diameter than the diameter of the large aperture diaphragm 34. Thus, the small aperture diaphragm 36 is disposed on or retracted from the optical axis by moving the swing lever 35 to change a numerical aperture. By selecting a numerical aperture in accordance with an object to be measured and a purpose, various observations having different purposes can be consecutively performed with the same telecentric lens system, which improves operating efficiency.

(7) In the diaphragm mechanisms 33A and 33B, the base end of the swing lever 35 is rotatable and the swing levers of the diaphragm mechanisms 33A and 33B are swung about the swinging supporting point. Thus, by operating the diaphragm mechanisms 33A and 33B when a pair of one of the variable magnification lens groups and the corresponding one of the diaphragm mechanisms is disposed on the optical axis of the front lens group 31, the numerical aperture of the diaphragm mechanism disposed on the optical axis can be varied. In other words, the numerical aperture of the diaphragm mechanism disposed on the optical axis can be varied only by operating one numerical switching unit 70, which improves operating efficiency.

(8) The magnification switching unit 55 and the numerical aperture switching unit 70 are provided to protrude in the directions parallel to the sliding direction of the slide plate 51, the directions being mutually in the same direction. Thus, when a desired magnification is initially switched by the magnification switching unit 55 and then the numerical aperture is varied by the numerical aperture switching unit 70, it is easy to hold the numerical aperture switching unit 70 after holding the magnification switching operating unit 55. In other words, after the magnification switching unit 55 is operated with one hand, the numerical aperture switching unit 70 can be held by moving the same hand for operation without looking away from the observation optical system.

(9) The various observations having different purposes can be consecutively performed in the same vision measuring instrument according to the vision measuring instrument 1. Consequently, operating efficiency can be considerably improved. Further, it is not required to use a separate vision measuring instrument depending on purposes, which reduces costs.

(10) Especially, the magnification switched by the magnification switching mechanism 5 is detected by the magnification detection switches 53 and 54 while the numerical aperture switched by the numerical switching unit 70 is detected by the numerical aperture detection switches 78 and 79. Then, an illumination condition of the illumination optical system 4 is corrected in accordance with a combination of the magnification and the numerical aperture in the image processor 61. Thus, highly precise measuring can be performed.

Explanation of Modification

The telecentric lens system and the image measurement instrument of the invention are not limited to the above-described exemplary embodiment, but include other arrangements as long as an object of the invention can be achieved.

Though the rear lens groups 32A and 32B as the variable magnification lens groups are switched by linearly sliding the slide plate 51 in the direction orthogonal to the optical axis of the front lens group 31 in the magnification switching mechanism 5 according to the exemplary embodiment, the rear lens groups 32A and 32B may be switched in other ways.

For example, the same advantage can be attained when a part of an outer circumferential portion of a rotatable discoid plate is arranged to be disposed on the optical axis of the front lens group 31, and the rear lens groups 32A and 32B as the variable lens groups and the corresponding diaphragm mechanisms 33A and 33B are arranged on a circle having a radius which is a distance between a rotating center of the discoid plate and the optical axis.

Also, the diaphragm mechanisms 33A and 33B are not limited to the above-described numerical aperture switching mechanisms, but may include other arrangements.

Figure 7:
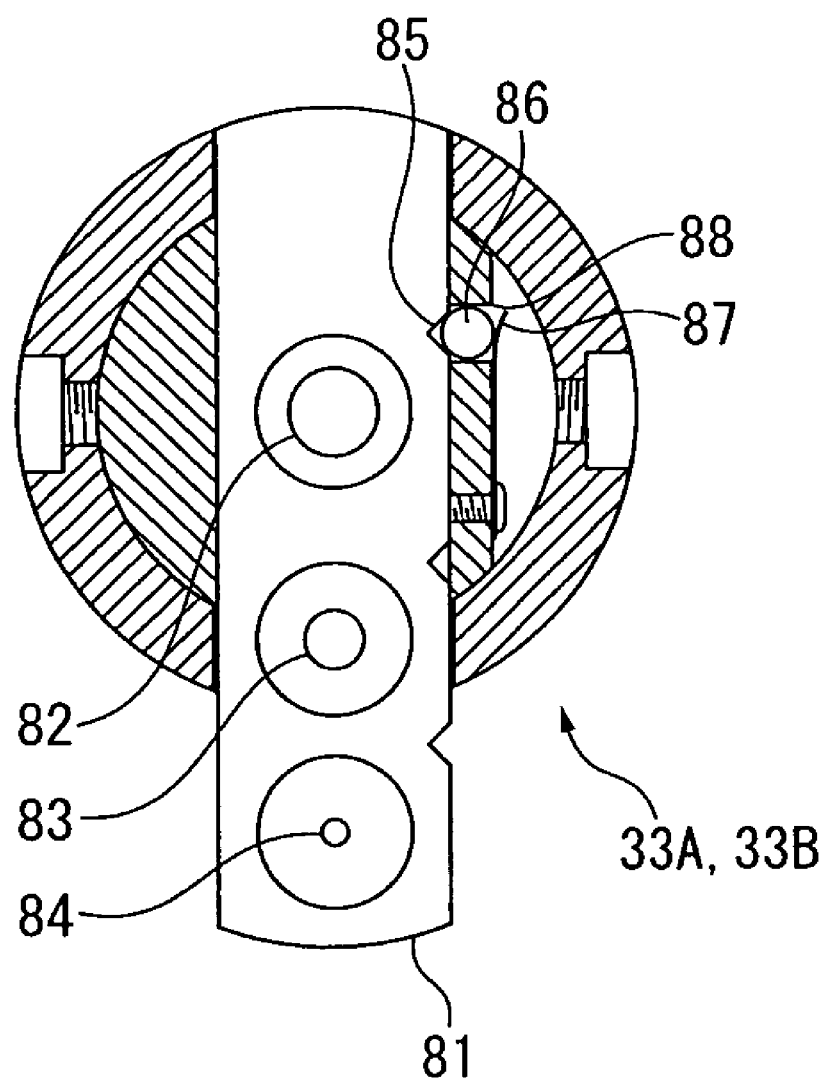
FIG. 7 shows a first modification of the diaphragm mechanism according to the exemplary embodiment.

For example, as shown in FIG. 7, a slide plate 81 may be provided slidably in a direction orthogonal to the optical axis of the front lens group 31, and a large aperture diaphragm 82, a middle aperture diaphragm 83 and a small aperture diaphragm 84 may be provided in a sliding direction of the slide plate 81. With this arrangement, the same advantage can be attained by switching the diaphragms by sliding the slide plate 81. When a V-shaped groove 85 is provided on the slide plate 81 while a guide groove 88 accommodating a ball 86 on a guide wall in a protruding direction of a spring 87, the slide plate 81 can be positioned at each position.

Figure 8:
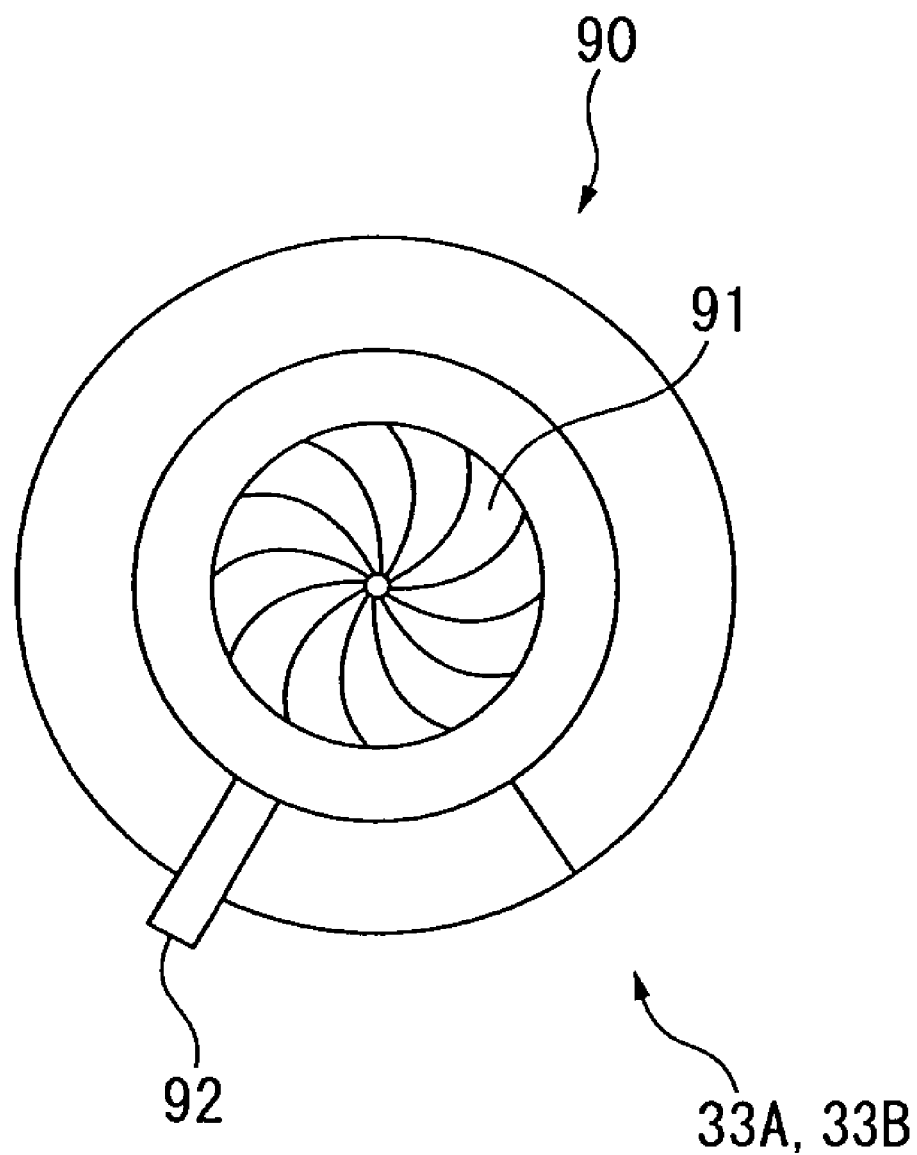
FIG. 8 shows a second modification of the diaphragm mechanism according to the exemplary embodiment.

Alternatively, the diaphragm mechanism may be provided by an iris diaphragm 90, in which a plurality of vanes 91 are superimposed while one end of the vanes 91 is swingably engaged with a circular groove on an inner circumference of a guide wall as shown in FIG. 8.

With such an arrangement, an angle of the vanes 91 can be changed by a lever 92 connected to the vanes 91 to consecutively change the numerical aperture. Thus, the numerical aperture can be adjusted to the most appropriate level in accordance with objects to be measured and purposes.

Alternatively, the numerical aperture may be changed by a driving source such as a motor provided on the numerical aperture changer. Further, the drive of the driving source may be controlled by a computer, which can be applicable to an automatic measurement and in-line measurement.

In short, the diaphragm mechanisms 33A and 33B are not limited to the above-described exemplary embodiment as long as the numerical aperture can be changed.

Though the rear lens groups, out of the front lens group 31 and the rear lens groups, serve as variable magnification lens groups (32A, 32B) having various magnifications in the above-described exemplary embodiment, the front lens group 31 may serve as the plurality of variable magnification lens groups having various magnifications.

Further, the number of variable magnification lens groups is not limited to two, but may be three or more.

Though the image processor 61 performs the correction processing for correcting the illumination condition of the illumination optical system 4 in accordance with a combination of a magnification detected by magnification detection switches 53 and 54 and a numerical aperture detected by the numerical aperture detection switches 78 and 79 according to the above-described embodiment, the correction processing is not limited thereto.

For example, a magnification of the variable lens groups 32A and 32B may be corrected or an axial displacement of an image generated when the variable lens groups 32A and 32B are switched may be corrected in accordance with the magnification detected by the magnification detection switches 53 and 54.

Incidentally, because a lens magnification is slightly different from a nominal value, the magnification is corrected and then a pixel value of the image is corrected with the corrected magnification based on a measuring result of the given length (a measuring result of a calibration scale). Alternatively, a planate calibration scale in which a coordinates of each grid point is known (stored as calibration data) may be captured by the variable magnification lens groups 32A and 32B. The coordinates of the grid point may be determined from the captured image data. Then, the magnification may be corrected on each place in the images based on a difference between the determined coordinates and the calibration data, and the pixel value of the image may be corrected at the corrected magnification.

Also, regarding axial alignment, displacement of the image may be caused when the variable magnification lens groups 32A and 32B are switched therebetween. When an object is measured using a reticle at this time, the position of an image of the object is changed by a misplaced distance due to switching of the variable magnification lens groups. Thus, correction may be performed by giving an offset value to a pixel value of the image, or by moving a table by the misplaced distance due to switching of the variable magnification lens groups when the automatic measuring instrument having an electric table is used.

The entire disclosure of Japanese Patent Application No. 2008-040389, filed Feb. 21, 2008 is expressly incorporated by reference herein.

What is claimed is:

1. A telecentric lens system comprising:
a front lens group;
a rear lens group having a front focal point coinciding with a rear focal point of the front lens group; and
diaphragm mechanisms, each of which is disposed at a position where the rear focal point of the front lens group coincides with the front focal point of the rear lens group, wherein
one of the front lens group and the rear lens group includes a plurality of variable magnification lens groups,
the diaphragm mechanisms are provided corresponding to the plurality of variable magnification lens groups, respectively, and
a magnification switching mechanism is provided to selectively move a pair of one of the plurality of variable magnification lens groups and one of the corresponding diaphragm mechanisms to be disposed on an optical axis of the other of the front lens group and the rear lens group, wherein
the magnification switching mechanism includes a slide plate, a guide mechanism that supports the slide plate to be slidable in a direction approximately orthogonal to the optical axis of the other of the front lens group and the rear lens group, and a magnification switching unit for sliding the slide plate,
a plurality of pairs of the variable magnification lens groups and the corresponding diaphragm mechanisms are arranged in the sliding direction of the slide plate,
each of the diaphragm mechanisms includes a numerical aperture changer including: a first diaphragm disposed on the optical axis of the other of the front lens group and the rear lens group; a swing lever having a middle portion supported to be swingable and an end supported to be retractable from a position of the first diaphragm; and a second diaphragm formed on the end of the swing lever and having a smaller diameter than a diameter of the first diaphragm, the numerical aperture changer changing a numerical aperture by switching the first diaphragm and the second diaphragm,
a numerical aperture switching unit is provided to rotatably connect a base end of the swing lever of the diaphragm mechanisms and swing the swing lever thereof about a swinging supporting point, and
the magnification switching unit and the numerical aperture switching unit are provided on the slide plate to protrude in directions parallel to the sliding direction of the slide plate, the directions being mutually in a same direction.

2. A vision measuring instrument, comprising:
a telecentric lens system according to claim 1; and
an image pickup optical system connected to the telecentric lens system.

3. A vision measuring instrument, comprising:
a telecentric lens system according to claim 1;
an illumination optical system introducing light into the telecentric lens system;
magnification detection units that detect a magnification switched by the magnification switching mechanism;
numerical aperture detection units that detect a numerical aperture switched by the numerical aperture changer;
an image pickup optical system connected to the telecentric lens system; and
an image processor that processes image information obtained by the image pickup optical system, wherein
the image processor performs at least one of an illumination condition correction of the illumination optical system, a magnification correction of the variable magnification lens groups, and an axial alignment in accordance with the magnification detected by the magnification detection units and the numerical aperture detected by the numerical aperture detection units.

* * * * *